United States Patent [19]

Kirkegaard

[11] 4,276,940

[45] Jul. 7, 1981

[54] GARDEN IMPLEMENT WITH A DRUM MOTOR

[75] Inventor: Allan K. Kirkegaard, Nykobing Mors, Denmark

[73] Assignee: Anpartsselskab, Nykøbing Mors, Denmark

[21] Appl. No.: 67,910

[22] Filed: Aug. 20, 1979

[30] Foreign Application Priority Data

Aug. 21, 1978 [DK] Denmark .............................. 3692/78

[51] Int. Cl.³ ....................... A01B 33/02; A01B 33/08
[52] U.S. Cl. ...................................... 172/42; 172/116; 172/125; 404/122
[58] Field of Search .................... 74/805; 172/42, 114, 172/116, 125; 310/67 R, 266; 404/122, 123, 121, 124

[56] References Cited

U.S. PATENT DOCUMENTS

| 1,980,056 | 11/1934 | Hedeby | 310/67 R X |
| 2,899,005 | 8/1959 | Speicher | 310/67 R X |
| 2,966,078 | 12/1960 | Wright | 74/805 |
| 3,052,167 | 9/1962 | Beale | 404/85 |
| 3,271,939 | 9/1966 | Granger et al. | 310/67 R X |
| 3,892,144 | 7/1975 | Kirkegaard | 74/805 |
| 3,897,165 | 7/1975 | Vural | 404/117 |
| 4,003,436 | 1/1977 | Foster et al. | 172/42 X |
| 4,121,127 | 10/1978 | Adelski et al. | 310/67 R |

FOREIGN PATENT DOCUMENTS

| 44864 | 11/1931 | Denmark . |
| 301966 | 12/1928 | United Kingdom . |
| 913349 | 12/1962 | United Kingdom . |
| 942941 | 11/1963 | United Kingdom . |
| 1327619 | 8/1973 | United Kingdom . |

Primary Examiner—George J. Marlo
Attorney, Agent, or Firm—Fleit & Jacobson

[57] ABSTRACT

A garden implement utilizing the shell of a drum motor as an essential constituent part of the garden implement. Non-rotating shafts of the drum motor are carried by prongs of a frame. The shell of the drum motor constitutes a roller forming a garden implement, or carries working tools for working soil.

6 Claims, 1 Drawing Figure

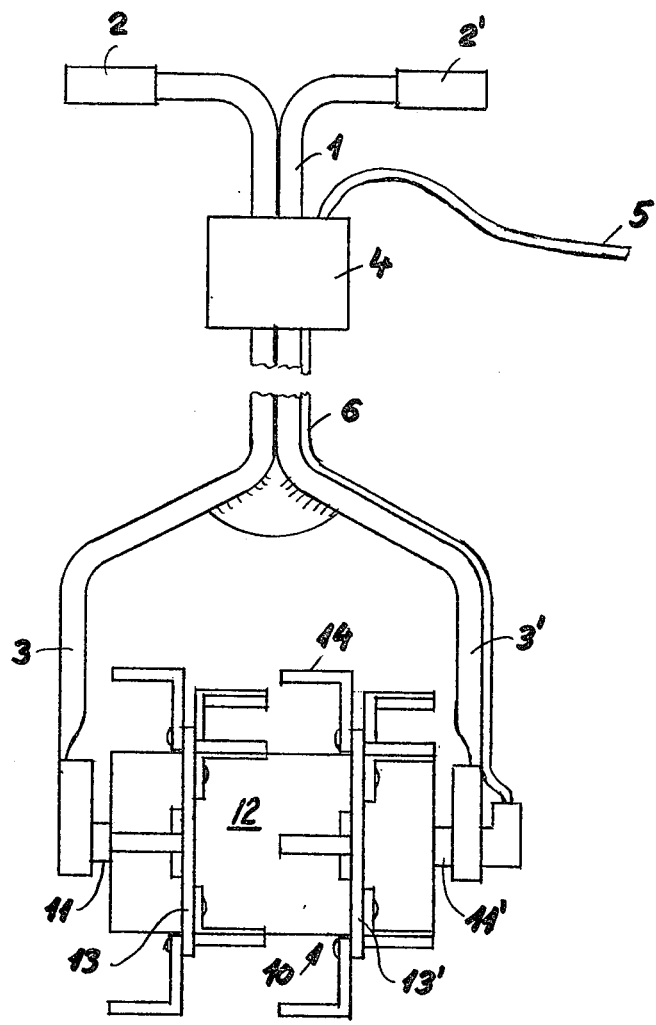

GARDEN IMPLEMENT WITH A DRUM MOTOR

The invention relates to a garden implement with a roller.

The object of the invention is to provide a roller which is powered by a motor, is very inexpensive in operation and requires only little maintenance.

This is achieved according to the invention in that the roller is a drum motor. The drum motor may be of the type described in the Danish Published Application No. 128,450 or in the Danish Application No. 1712/78. The first is driven by an AC motor and the second by a DC motor.

The garden implement may consist of an outer frame of a shape similar to that of a lawn mower, and the shafts of the drum motor which protrude through the end covers are clamped between the ends of the U-shaped prongs of the frame.

All rotary parts including the driving electric motor and the gearing transmission from said motor to the shell of the drum motor are sealingly housed within the shell and end covers of the drum motor. As a result of this no dirt or water will penetrate into the driving parts, and the garden implement can therefore be cleaned by flushing by means of a garden hose.

The garden implement of the invention is also suitable for other purposes than rolling, it being possible to attach working tools to the shell of the drum motor.

These working tools may be cultivator legs. In order for a garden cultivator to operate appropriately, it must be driven by a motor. In known garden cultivators the cultivator legs, however, are fixed on a shaft that rotates in the frame and is driven by a combustion engine via a suitable transmission. Such a garden implement is, however, far more expensive to manufacture and requires much more maintenance than the garden implement of the invention.

The working tools may also be projecting bosses or spikes, whereby the garden implement may be used as a sheepsfoot roller.

The working tools may consist of knives as well whereby the garden implement may be used for cutting edges.

The invention will be described in greater detail below with reference to the drawing which shows a garden implement shaped as a garden cultivator in accordance with the invention.

The drawing shows a garden implement comprising a frame 1 and a drum motor 10. The frame 1 is shaped like the frame of a lawn mower, it being composed of two bent metallic tubes which at one end form handles 2,2' protruding to their respective sides, and at the other form the prongs 3,3' of a U-shaped fork.

Further, the frame carries a control box 4 supplied with current through an electric cable 5. A lead 6 carries the necessary current from the control box 4 to the drum motor 10, whose protruding shafts 11,11' are clamped between the U-shaped prongs 3,3' of the frame. The lead 6 is passed through the shaft 11'. The shell 12 of the drum motor 10 has welded thereon two rings 13,13' to which cultivator legs 14 are bolted, making them easy to replace in case of damage.

I claim:
1. A garden implement comprising:
   means for defining a frame having spaced apart downwardly extending prongs;
   a drum motor having non-rotating protruding shafts carried by said prongs; and
   a shell encompassing and rotatably driven by said drum motor, the shell constituting a roller forming a garden implement.
2. A garden implement comprising:
   means for defining a frame having spaced apart downwardly extending prongs;
   a drum motor having non-rotating protruding shafts carried by said prongs;
   a shell encompassing and rotatably driven by said drum motor, the shell constituting a roller forming a garden implement;
   working tools for working soil; and
   means for fixing said working tools to said shell so that the tools project outwardly from said shell.
3. A garden implement according to claim 2, characterized in that the working tools consist of cultivator legs.
4. A garden implement according to claim 2, characterized in that the working tools consist of projecting bosses or spikes.
5. A garden implement according to claim 2, characterized in that the working tools consist of knives.
6. A garden implement according to claim 2, wherein said means for fixing comprise rings welded on said shell, and means for connecting said working tools to said rings.

* * * * *